May 7, 1929.  J. A. VOLK, JR  1,711,623
ELECTRICAL FIXTURE
Filed Aug. 9, 1923
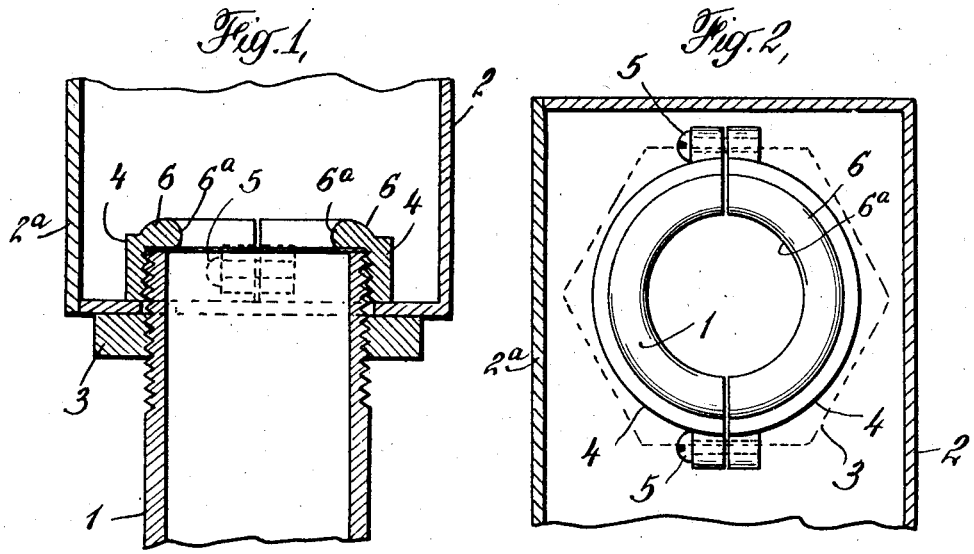
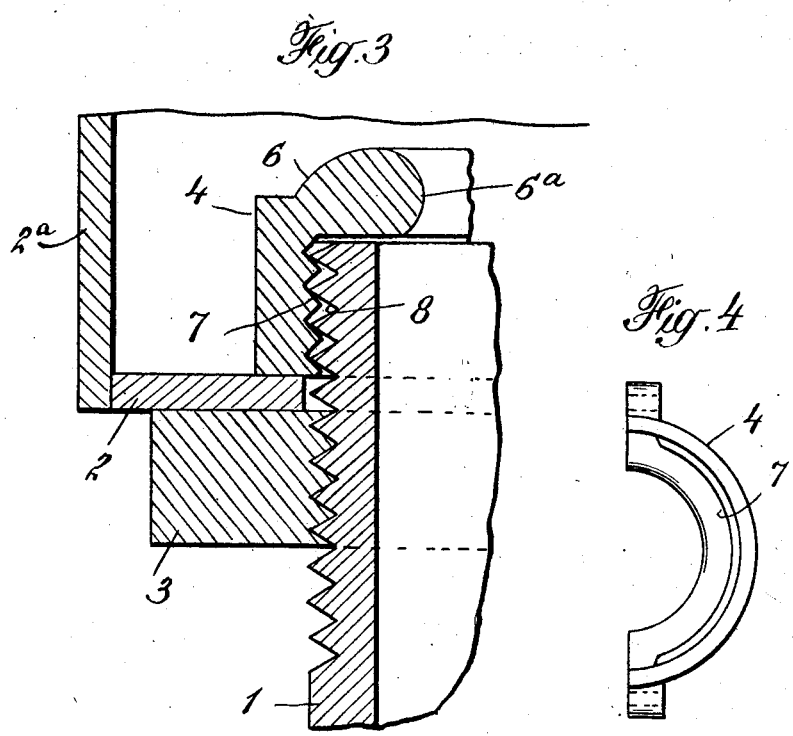
Joseph A. Volk Jr, INVENTOR
BY Ew Scherr Jr, ATTORNEY Patented May 7, 1929.

1,711,623

UNITED STATES PATENT OFFICE.

JOSEPH A. VOLK, JR., OF NORWALK, CONNECTICUT.

ELECTRICAL FIXTURE.

Application filed August 9, 1923. Serial No. 656,552.

My present invention relates to improvements in electrical fixtures comprising specifically a diametrically divided or two-part internally screw-threaded collar provided with bushing means, the two parts of said collar being adapted to be clamped together about the screw-threaded end of a conduit pipe within a conduit- or junction-box or the like, by means of screws connecting the adjacent ends of said parts whereby said collar has all the effect of a nut and has the advantage over a nut that it can be applied and clamped in place in a tight corner with a screw driver where a wrench could only be used with difficulty or not at all. Further, I provide a feature by which the act of clamping together the parts of the collar as aforesaid about the threaded end of the conduit pipe serves to wedge the collar endwise snugly against the adjacent wall of the conduit-box.

In the drawings, Fig. 1 is a sectional view, partly in elevation, through my device shown in use in connection with an electrical conduit-box or the like and a conduit-pipe; Fig. 2 is a plan view of the parts shown in Fig. 1; Fig. 3 is a portion of Fig. 1 shown on an enlarged scale; and Fig. 4 is an underneath plan view of one of the parts of my device.

Describing now my invention by reference to the devices of the drawings which illustrate a preferred embodiment of my improvements in use in connection with an electrical conduit pipe 1 and box 2, having a cover 2ª, 3 is the usual nut on the screw-threaded end of said pipe outside of the box. Ordinarily, a nut is also used on the threaded pipe end inside the box to fasten pipe and box together, but according to my invention I substitute said inside nut by an internally screw-threaded collar formed in two parts 4—4 adapted to be clamped together by the externally screw-threaded end of the conduit pipe inside the conduit-box by merely using a screw driven on the screws 5 connecting the adjacent ends of the parts 4—4, said ends for this purpose being preferably extended radially outwardly in the form of ears or lugs as shown, to provide sufficient stock to receive said screws.

A nut on the pipe end inside the illustrated conduit-box would be so confined by the walls of the box (and this is a common occurrence) that a wrench could only be used with difficulty if at all, whereas a screw driver can be readily used to tighten the screws 5 of my collar device to clamp its parts 4 to the pipe end. Furthermore, it will be noted that I form each of the parts 4 at the top with an inwardly directed flange 6 having rounded edges 6ª, which flange covers the cut off end of the pipe within the conduit-box and protects the insulation of the wiring from being cut or injured by the rough or sharp edges of said pipe.

Furthermore, I give the face 7 of the screw-threads of the collar an inclination which is preferably different from that of the face 8 of the coacting screw-threads of the pipe end, said different inclination being such that it wedges and forces the collar 4—4 rapidly endwise towards the unthreaded body portion of the conduit pipe, while the collar parts are being clamped together as above described. In other words, this serves to clamp the wall of the conduit-box between the collar 4—4 and the outside nut 3, Fig. 3 clearly showing the larger angle subtended and the greater inclination of the faces 7 of the screw-threads of the collar as compared with the inclination of the faces 8 of the coacting pipe threads.

Thus, my device is an excellent substitute for the usual inside nut and has the great advantage that it can be applied where a wrench could only be used with difficulty if at all. Further, the collar is adapted to bush the pipe opening.

It is possible that changes may be made in the aforesaid preferred embodiment of my invention which will still be within the scope and spirit of the foregoing disclosure and within the scope and spirit of the annexed claims and which as such are intended to be covered thereby.

What I claim is:

1. An improvement in electrical fixtures comprising an internally screw-threaded collar in two parts adapted to be clamped together about the externally screw-threaded end of a conduit pipe inside a conduit box; and means for clamping together said collar-parts comprising screws directed transversely to the length of the pipe and connecting the adjacent free ends of said collar parts; the screw-threads of the collar in coacting with the pipe threads, serving to wedge the collar endwise towards the unthreaded body portion of the pipe and against the inside of the conduit-box, while the parts of the collar are being clamped together on the pipe end.

2. An improvement in electrical fixtures comprising an internally screw-threaded collar in two parts adapted to be clamped together about the externally screw-threaded end of a conduit pipe inside a conduit-box; and means for clamping together said collar-parts comprising screws directed transversely to the length of the pipe and connecting the adjacent free ends of said collar parts; the screw-threads of the collar subtending a greater angle than the coacting pipe threads, the act of clamping together the parts of the collar about the threaded pipe end wedging the collar endwise towards the unthreaded body portion of the pipe and against the inside of the conduit-box.

Signed at South Norwalk, in the county of Fairfield and State of Connecticut, this 4th day of August A. D. 1923.

JOSEPH A. VOLK, Jr.